United States Patent
Lee et al.

(10) Patent No.: US 10,019,126 B2
(45) Date of Patent: Jul. 10, 2018

(54) TOUCH WINDOW AND DISPLAY INCLUDING THE SAME

(71) Applicant: LG INNOTEK CO., LTD., Seoul (KR)

(72) Inventors: Jun Lee, Seoul (KR); In Tae Kim, Seoul (KR); Jung Ki Lee, Seoul (KR); Beom Sun Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 526 days.

(21) Appl. No.: 14/638,296

(22) Filed: Mar. 4, 2015

(65) Prior Publication Data

US 2015/0253910 A1 Sep. 10, 2015

(30) Foreign Application Priority Data

Mar. 4, 2014 (KR) .................. 10-2014-0025725

(51) Int. Cl.
| | |
|---|---|
| *G06F 3/047* | (2006.01) |
| *G06F 3/044* | (2006.01) |
| *G09G 5/00* | (2006.01) |

(52) U.S. Cl.
CPC .............. *G06F 3/047* (2013.01); *G06F 3/044* (2013.01); *G09G 5/006* (2013.01); *G06F 2203/04112* (2013.01); *G09G 2300/04* (2013.01)

(58) Field of Classification Search
None
See application file for complete search history.

(56) References Cited

U.S. PATENT DOCUMENTS

| | | | | |
|---|---|---|---|---|
| 7,813,030 | B2* | 10/2010 | Lo | G02B 26/005 |
| | | | | 345/60 |
| 8,872,039 | B2* | 10/2014 | Kajiya | G06F 3/0412 |
| | | | | 174/255 |
| 9,857,656 | B2* | 1/2018 | Seo | G02F 1/155 |
| 9,898,053 | B2* | 2/2018 | Lee | G06F 3/044 |
| 2011/0210935 | A1* | 9/2011 | Chuang | G06F 3/0412 |
| | | | | 345/174 |
| 2012/0318585 | A1 | 12/2012 | Kim et al. | |
| 2013/0234974 | A1* | 9/2013 | Guard | G06F 3/044 |
| | | | | 345/174 |
| 2014/0111709 | A1* | 4/2014 | Kim | G02F 1/13338 |
| | | | | 349/12 |

(Continued)

FOREIGN PATENT DOCUMENTS

KR 10-2010-0008490 A 1/2010
KR 10-2012-0138287 A 12/2012

*Primary Examiner* — Srilakshmi K Kumar
*Assistant Examiner* — Karin Kiyabu
(74) *Attorney, Agent, or Firm* — Ked & Associates LLP

(57) ABSTRACT

A touch window may include a substrate, and an electrode part on the substrate to detect a position. The electrode part includes a first sub-pattern, a second sub-pattern adjacent to the first sub-pattern, a first electrode layer on the first sub-pattern, and a second electrode layer on the second sub-pattern. Another touch window includes a substrate, and an electrode part on the substrate to detect a position, the electrode part includes a first sub-pattern, a second sub-pattern adjacent to the first sub-pattern, an electrode layer on the first sub-pattern, a first anti-reflective layer on the first sub-pattern, and a second anti-reflective layer on the second sub-pattern.

13 Claims, 13 Drawing Sheets

(56) References Cited

U.S. PATENT DOCUMENTS

| | | | |
|---|---|---|---|
| 2014/0290984 A1* | 10/2014 | Zhou | H05K 1/0296 174/251 |
| 2014/0318836 A1* | 10/2014 | He | G02F 1/1333 174/257 |
| 2015/0009420 A1* | 1/2015 | Zhou | H05K 3/107 349/12 |
| 2015/0177876 A1* | 6/2015 | Ishii | G06F 3/044 345/174 |
| 2015/0193044 A1* | 7/2015 | Kim | G06F 3/044 345/174 |
| 2015/0205424 A1* | 7/2015 | Park | G06F 3/0414 345/174 |
| 2015/0227239 A1* | 8/2015 | Kim | G06F 3/044 345/174 |
| 2015/0248186 A1* | 9/2015 | Oh | G06F 3/047 345/174 |
| 2015/0253810 A1* | 9/2015 | Shin | G06F 1/16 345/174 |
| 2016/0195966 A1* | 7/2016 | Chang | G06F 3/0412 345/173 |
| 2016/0246435 A1* | 8/2016 | Kim | G06F 3/0416 |
| 2017/0293382 A1* | 10/2017 | Ishii | G06F 3/044 |
| 2018/0046284 A1* | 2/2018 | Higashi | G06F 3/044 |

\* cited by examiner

TOUCH WINDOW AND DISPLAY INCLUDING THE SAME

CROSS-REFERENCE TO RELATED APPLICATION

This application claims priority under 35 U.S.C. § 119 to Korean Application No. 10-2014-0025725 filed on Mar. 4, 2014, whose entire disclosure is hereby incorporated by reference.

BACKGROUND

1. Field

The disclosure relates to a touch window and a display including the same.

2. Background

Recently, a touch panel, which performs an input function through the touch of an image displayed on a display by an input such as a stylus pen or a finger has been applied to various electronic appliances. The touch panel may be representatively classified into a resistive touch panel and a capacitive touch panel. In the resistive touch panel, the position of the touch point is detected by detecting the variation of resistance according to the connection between electrodes when pressure is applied to the input device. In the capacitive touch panel, the position of the touch point is detected by detecting the variation of capacitance between electrodes when a finger of the user is touched on the capacitive touch panel. When taking into consideration the convenience of a fabrication scheme and a sensing power, the capacitive touch panel has been spotlighted in a smaller model touch panel recently.

Indium tin oxide (ITO), which has been most extensively used for a transparent electrode of the touch panel, requires a high price, and is easily subject to physical damage due to the bending or the warping of a substrate, so that the characteristic of the ITO for the electrode is deteriorated. Accordingly, the ITO is not suitable for a flexible device. Further, when the ITO is applied to a large touch panel, a problem may be caused by high resistance.

In order to solve the problem, the studies and researches on alternative electrodes have been actively performed. In particular, although there is an attempt to use a metallic material instead of ITO to form an electrode, the metallic material increases the visibility so that the pattern of the transparent electrode may be viewed. In addition, when a mesh pattern is formed, an undercut may be formed between a sub-pattern and an electrode material due to an etchant. Therefore, the adhesion between the sub-pattern and the electrode material is reduced, so that the disconnection of the electrode may occur.

BRIEF DESCRIPTION OF THE DRAWINGS

The embodiments will be described in detail with reference to the following drawings in which like reference numerals refer to like elements wherein.

DETAILED DESCRIPTION

Figure 1:
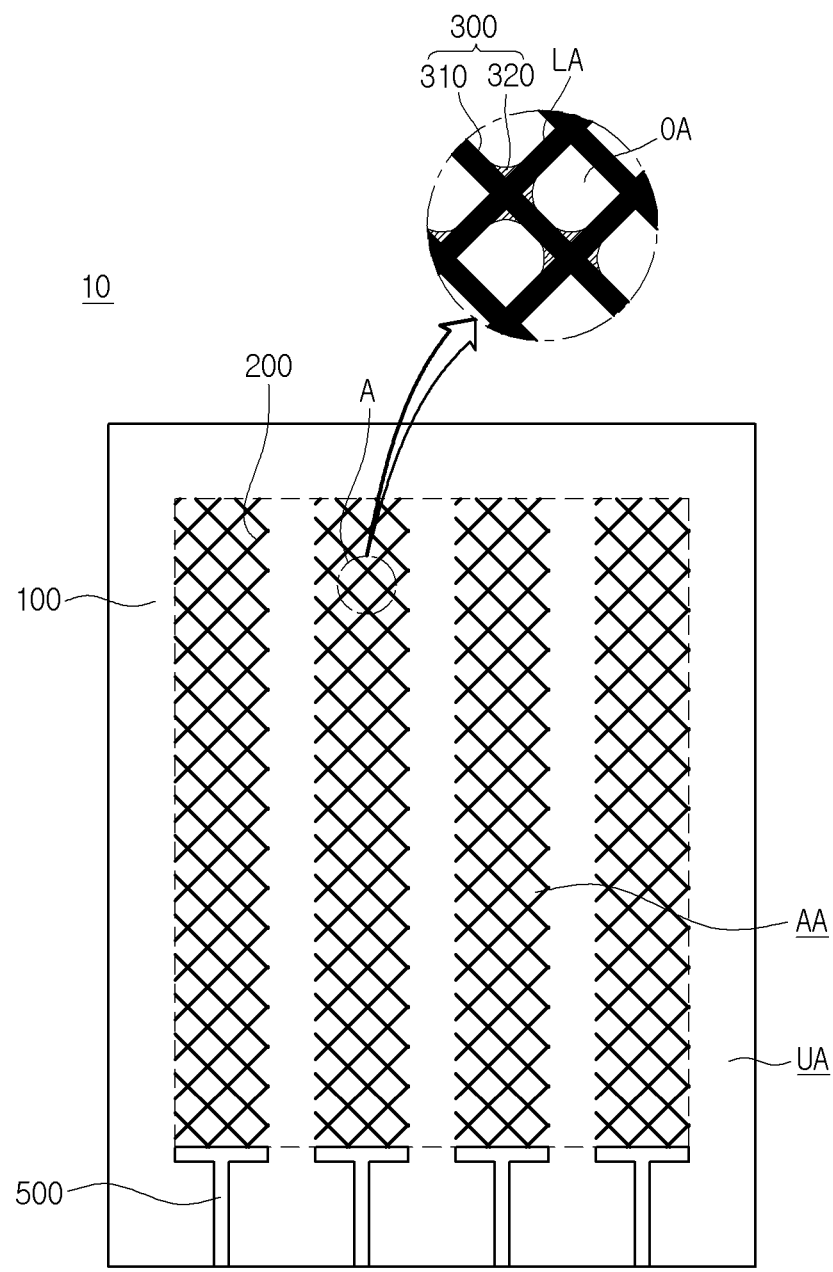
FIG. 1 is a plan view showing a touch window according to the embodiment.

A touch window according to the embodiment will be described with reference to FIGS. 1 and 2. Referring to FIG. 1, a touch window 10 according to the embodiment includes a substrate 100 having an active region AA in which the position of an input device (e.g., finger) is detected and an unactive region UA provided at a peripheral portion of the active region AA.

An electrode part 200 may be formed in the active region AA so that the input device can be detected. In addition, a wire 500 may be formed in the unactive region UA for the electrical connection of the electrode part 200. In addition, an external circuit, which is connected to the wire 500, may be placed in the unactive region UA. If the input device such as the finger touches the touch window, the variation of capacitance occurs in the touched part by the input device, and the touched part subject to the variation of the capacitance may be detected as a touch point.

The substrate 100 may include various materials sufficient to support the electrode part 100, the wire 500, and a printed circuit board formed thereon. The substrate 100 may be rigid or flexible. For example, the substrate 100 may include a glass substrate or a plastic substrate. In detail, the substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

An outer dummy layer is formed in the unactive area UA of the substrate 100. The outer dummy layer may be coated with a material having a predetermined color so that the wire 500 and a printed circuit board connecting the wire 500 to an external circuit cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The electrode part 200 may be formed on the substrate 100. The electrode part 200 may sense the touch by the input device such as a finger. Although FIG. 1 shows that the electrode part 200 extends in one direction on the substrate 100, the embodiment is not limited thereto. Therefore, the electrode part 200 may extend in another direction crossing the one direction. In addition, the electrode part 200 may include two types of electrode parts having a shape extending in one direction and a shape in another direction.

In other words, one electrode part pattern and another electrode part pattern may be formed through various schemes according to the structure of the touch window. For example, the one electrode part pattern and the another electrode part pattern may be formed together on one surface of a cover substrate.

In addition, the one electrode part pattern may be formed on one surface of the cover substrate, and the another electrode part pattern may be formed on one surface of an electrode substrate provided on the cover substrate. In addition, the one electrode part pattern may be formed on one surface of a first electrode substrate provided on the cover substrate, and the another electrode part pattern may be formed on a second electrode substrate provided on the first electrode substrate. Further, the one electrode part pattern may be formed on one surface of glass or a film provided on the cover substrate, and the another electrode pattern may be formed on an opposite surface of the glass or the film.

The touch window according to the embodiment may have various structures according to positions in which the one electrode part pattern and the another electrode part pattern are formed. However, the embodiment is not limited thereto, but the one electrode pattern and the another electrode pattern may be formed in various positions.

Meanwhile, the electrode part 200 may include a conductive pattern. For example, the electrode part 200 may be provided in a mesh shape. In this case, the mesh shape may be randomly formed to prevent a moiré phenomenon. The moiré phenomenon occurs when periodical stripes overlap with each other. Since adjacent stripes overlap with each other, a thickness of a stripe is thickened so that the stripe is spotlighted as compared with other stripes. In order to prevent the moiré phenomenon, the conductive pattern shape may be variously formed.

In detail, the electrode part 200 includes a conductive pattern opening part OA and a conductive pattern line part LA. In this case, the conductive pattern line part LA has a line width of 0.1 µm to 10 µm If the line width of the conductive pattern line part LA is 0.1 µm or less, the conductive pattern line part may not be manufactured. If the line width of the conductive pattern line part LA is 10 µm or less, the pattern of the electrode part 200 may not be viewed. Preferably, the line width of the conductive pattern line part LA may be in the range of 0.1 µm to 10 µm Meanwhile, as shown in FIG. 1, the conductive pattern may have a uniform shape, but the embodiment is not limited thereto. In other words, the conductive pattern opening part OA may have various shapes. For example, the conductive pattern opening part OA may have various shapes such as a rectangular shape, a diamond shape, a pentagonal shape, or a hexagonal shape, or a circular shape. In addition, the conductive pattern opening part may have a regular shape or a random shape.

The electrode part 200 has the mesh shape, so that the pattern of the electrode part 200 may not be viewed in the active region AA. In other words, even if the electrode part 200 includes metal, the pattern may not be viewed. In addition, even if the electrode part 200 is applied to a large-size touch window, the resistance of the touch window may be lowered. In addition, when the electrode part 200 is formed through a printing process, printing quality can be improved, so that a high-quality touch window can be ensured. Further, when the electrode part 200 is applied to a flexible display or a curved display, the electrode can be prevented from being cracked, and the bending characteristic and the reliability of the display can be improved.

Figure 2:
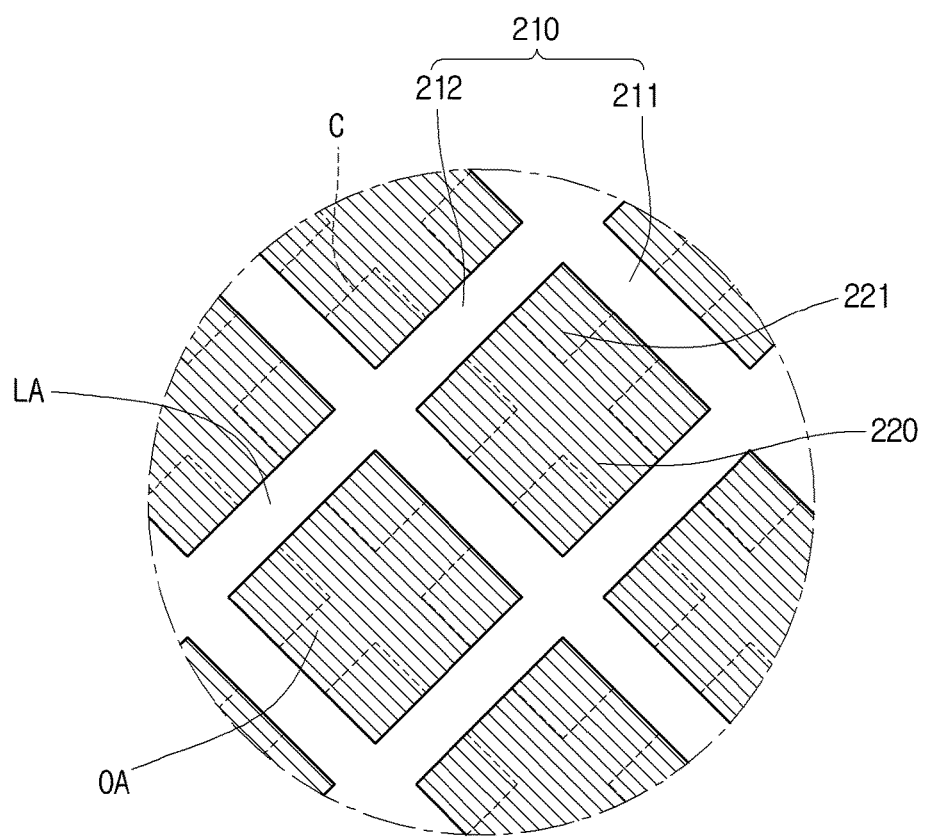
FIGS. 2 and 3 are enlarged views showing a part A of FIG. 1.
Figure 3:
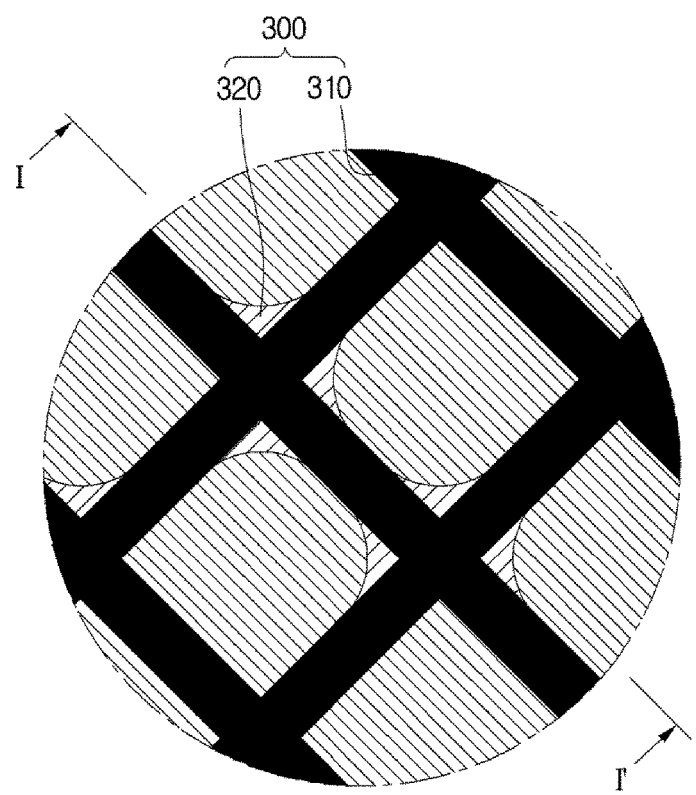
Figure 4:
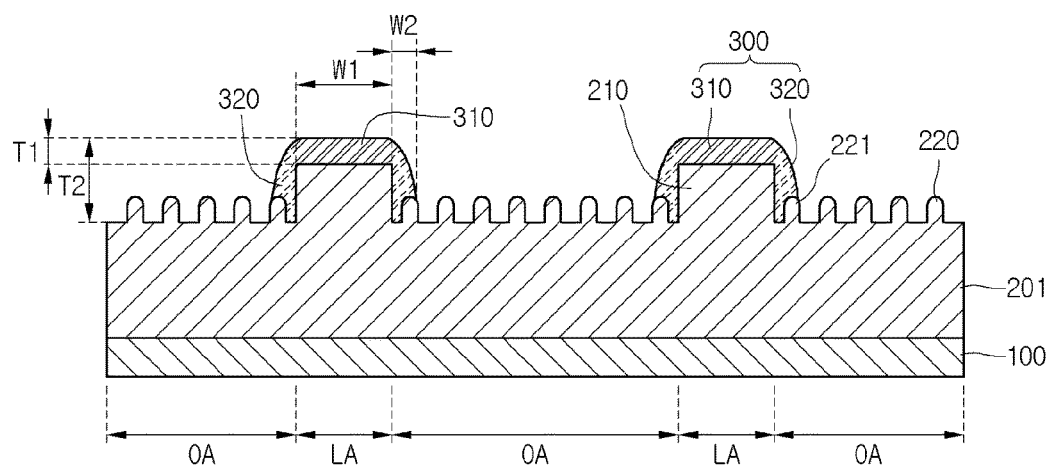
FIG. 4 is a sectional view taken along line I-I' of FIG. 3.

Referring to FIGS. 2 to 4, the electrode part 200 may include a first sub-pattern 210, a second sub-pattern 220, and an electrode layer 300. Meanwhile, FIG. 2 is a view showing only the first and second sub-patterns 210 and 220 before the electrode layer 300 is formed, and FIG. 3 is a view showing the electrode layer 300 formed on the first and second sub-patterns 210 and 220.

The first sub-pattern 210 is provided on the substrate 100. The first sub-pattern 210 is provided at the mesh line part LA. Accordingly, the first sub-pattern 210 is provided in the mesh shape. The first sub-pattern 210 may be an embossed pattern.

Meanwhile, referring to FIG. 2, the first sub-pattern 210 may include third and fourth sub-patterns 211 and 212 having mutually different directionalities. In other words, the first sub-pattern 210 may include the third sub-pattern 211 extending in one direction and the fourth sub-pattern 212 extending in another direction crossing the one direction.

The second sub-pattern 220 is provided on the substrate 100. The second sub-pattern 220 is provided at the mesh opening part OA. Accordingly, the second sub-pattern 220 may be interposed between the first sub-patterns 210. The second sub-pattern 220 may be an embossed pattern. The line width of the second sub-pattern 220 may be less than that of the first sub-pattern 210.

Meanwhile, the second sub-pattern 220 may include a fifth sub-pattern 221. The fifth sub-pattern 221 may be interposed between the third sub-pattern 211 and the fourth sub-pattern 212. The fifth sub-pattern 221 may be provided in a part C adjacent to the intersection between the third and fourth sub-patterns 211 and 212. The first and second sub-patterns 210 and 220 may include resin or polymer.

In addition, referring to FIGS. 3 and 4, the electrode layer 300 may include first and second electrode layers 310 and 320. The first electrode layer 310 may be provided on the first sub-pattern 210. Accordingly, the electrode layer 300 is provided at the mesh line part LA, and provided in a mesh shape. The electrode layer 300 may include various metals having superior electrical conductivity. For example, the electrode layer 300 may include Cu, Au, Ag, Al, Ti, Ni or an alloy thereof.

The second electrode layer 320 may be provided on the second sub-pattern 220. The second electrode layer 320 may be provided on a portion of the second sub-pattern 220. Therefore, the second electrode layer 320 may be provided at a mesh opening part. The second electrode layer 320 may be provided on the second sub-pattern 220 interposed between the first sub-patterns 210.

In detail, the second electrode layer 320 may be provided on the fifth sub-pattern 221. Accordingly, the second electrode layer 320 may be interposed between the third and fourth sub-patterns 211 and 212. In other words, the second electrode layer 320 may be provided in the part C adjacent to the intersection between the third and fourth sub-patterns 211 and 212.

Meanwhile, the second electrode layer 320 may be provided at a portion of the fifth sub-pattern 221. The second electrode layer 320 may be partially provided on the fifth sub-pattern 221. In other words, the second electrode layer 320 may be provided at only a portion of the part C adjacent to the intersection between the third and fourth sub-patterns 211 and 212.

The second electrode layer 320 may extend from the first electrode layer 310. In addition, the second electrode layer 320 may be integrated with the first electrode layer 310. Accordingly, the second electrode layer 320 may include the same material as that of the first electrode layer 310.

The second electrode layer 320 may have a thickness T2 thicker than a thickness T1 of the first electrode layer 310.

Accordingly, the disconnection or the short of the first electrode layer 310 may be prevented. In addition, even if a portion of the first electrode layer 310 is shorted or delaminated, the second electrode layer 320 may compensate for the short or the delamination of the portion of the first electrode layer 310, so that the electrical short can be compensated.

The second electrode layer 320 may have a width W2 narrower than a width W1 of the first electrode layer 310. Accordingly, the first electrode layer 310 can be prevented from being viewed due to the second electrode layer 320.

Meanwhile, referring to FIG. 1, the wire 500 is formed in the unactive region UA. The wire 500 may apply an electrical signal to the electrode part 200. The wire 500 is formed in the unactive region UA so that the wire 500 may not be viewed.

Meanwhile, although not shown in drawings, a printed circuit board connected with the wire 500 may be further provided. The printed circuit board may be applied to various printed circuit board such as a flexible printed circuit board (FPCB).

Meanwhile, a touch window according to another embodiment will be described with reference to FIG. 5. In the following description about the touch window according to another embodiment, the details of the structures and the components the same as or similar to those of the touch window according to the embodiment described above will be omitted.

Figure 5:
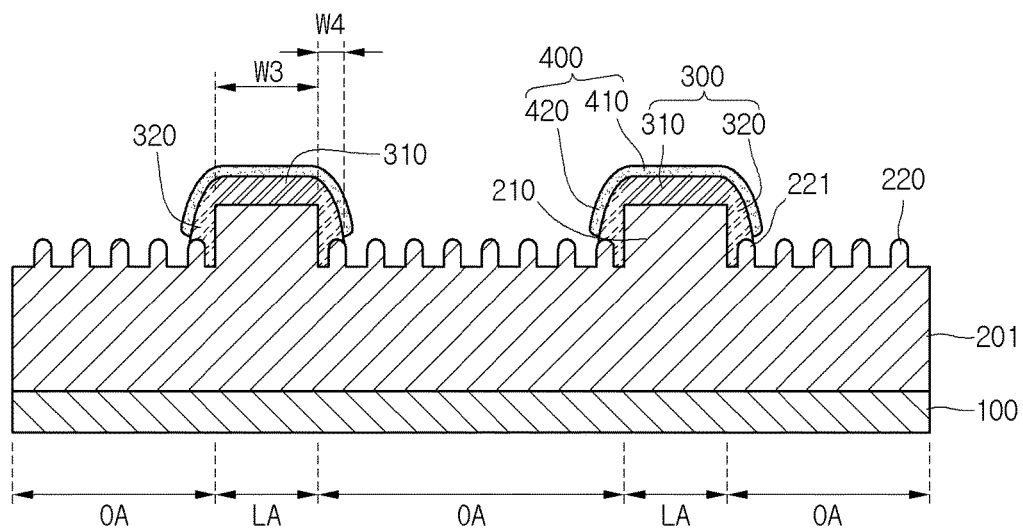
FIG. 5 is a sectional view showing a touch window according to another embodiment.

Referring to FIG. 5, an anti-reflective layer 400 may be provided on the electrode layer 300. The anti-reflective layer 400 may be provided on the top surface of the electrode layer 300. The anti-reflective layer 400 may cover the entire top surface of the electrode layer 300. In other words, the anti-reflective layer 400 may be formed on at least one surface of the electrode layer 300 to prevent the electrode layer 300 formed of metal from being oxidized, and prevent reflection resulting from the total reflection of the metal.

In detail, the anti-reflective layer 400 may include a first anti-reflective layer 410 provided on the first electrode layer 310 and a second anti-reflective layer 420 provided on the second electrode layer 320.

The first anti-reflective layer 410 may be interposed between the first sub-pattern 210 and the first electrode layer 310 to improve the adhesion between the first electrode layer 310 and the first sub-pattern 210.

In addition, the second anti-reflective layer 420 may be provided on the fifth sub-pattern 221. Accordingly, the second anti-reflective layer 420 may be interposed between the third and fourth sub-patterns 211 and 212. In other words, the second anti-reflective layer 420 may be provided in the part C adjacent to the intersection between the third and fourth sub-patterns 211 and 212.

The second anti-reflective layer 420 has a width W4 narrower than a width W3 of the first anti-reflective layer 410. The width W4 of the second anti-reflective layer 420 may correspond to the width W2 of the second electrode layer 320, and the width W3 of the first anti-reflective layer 410 may correspond to the width W1 of the first electrode layer 310.

The anti-reflective layer 400 may include at least one of a metal oxide, a metal nitride, and a metal oxynitride. In addition, when the electrode layer 300 includes first metal, the anti-reflective layer 400 may include an oxide including the first metal. In addition, the anti-reflective layer 400 may be a blackened layer. For example, the anti-reflective layer 400 may employ one selected from the group consisting of CuO, CrO, FeO, and Ni2O3, but the embodiment is not limited thereto. In other words, the anti-reflective layer 400 may employ a black-based material to block the reflectance of the electrode layer 300.

The anti-reflective layer 400 and the electrode layer 300 may be simultaneously formed or separately formed. In addition, the anti-reflective layer 400 can prevent the increase of the visibility caused by the light reflection of the electrode layer 300 including the metallic material. In particular, as described above, since the anti-reflective layer 400 may lower the reflectance from a lateral side of the electrode layer 300 as well as the top surface of the electrode layer 300, so that the anti-reflective layer 400 has an advantage in visibility. In addition, the visibility can be improved even in a wide viewing angle. Therefore, the optical characteristic of the electrode layer 300 can be improved. In addition, the anti-reflective layer 400 can protect the electrode layer 300 from an external environment. Therefore, the reliability of the touch window can be improved.

Figure 6:
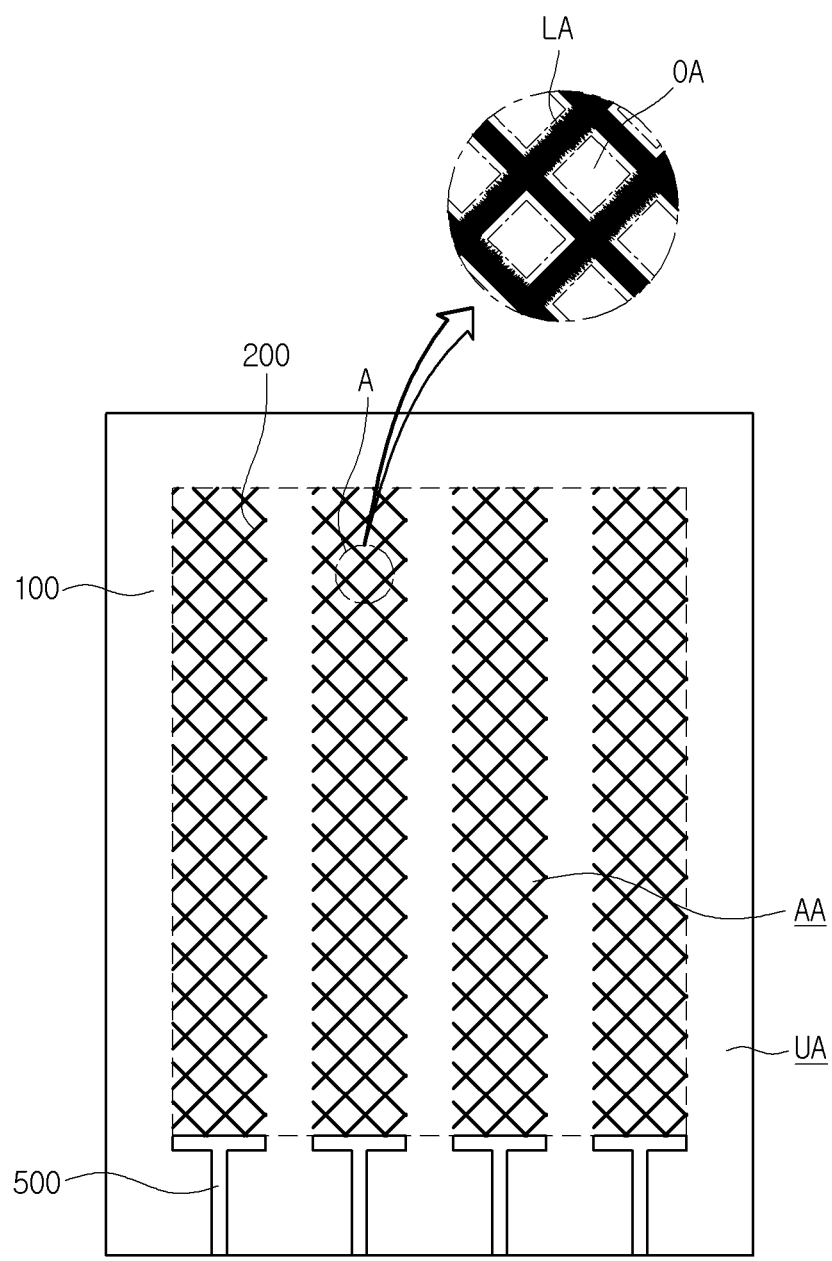
FIG. 6 is a plan view showing a touch window according to another embodiment.
Figure 7:
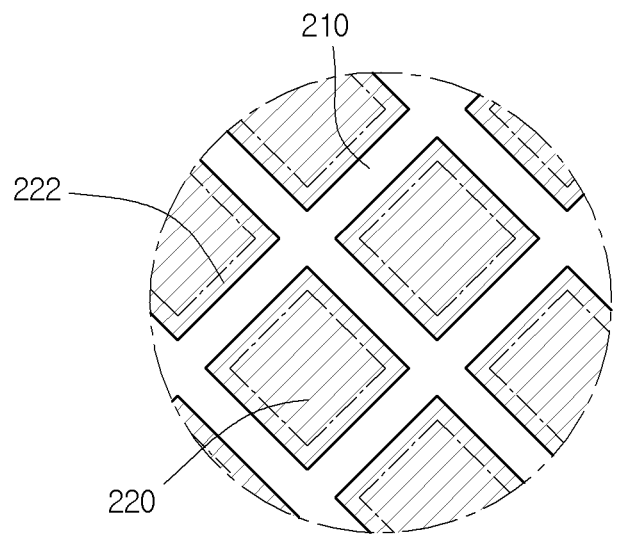
FIGS. 7 and 8 are enlarged views showing a part B of FIG. 6.

Meanwhile, a touch window according to another embodiment will be described with reference to FIGS. 6 to 8. Referring to FIG. 7, an electrode part 200 includes first and second sub-patterns 210 and 220, and the second sub-pattern 220 includes a sixth sub-pattern 222. The sixth sub-pattern 222 is provided along the first sub-pattern 210. In other words, the sixth sub-pattern 222 is a portion of the second sub-pattern 220 provided along the first sub-pattern 210. The sixth sub-pattern 222 is provided at a lateral side of the second sub-pattern 222 adjacent to the first sub-pattern 210.

Figure 8:
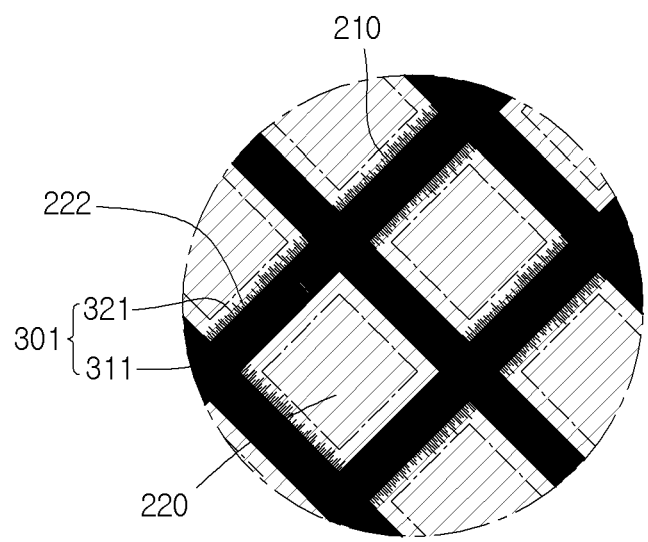

Referring to FIG. 8, an electrode layer 301 includes first and second electrode layers 311 and 321. The first electrode layer 311 is provided on the first sub-pattern 210. The second electrode layer 321 is provided on the sixth sub-pattern 222. Accordingly, the second electrode layer 321 is provided along the first sub-pattern 210. In other words, the second electrode 321 is provided along the first electrode layer. The second electrode layer 321 is provided at a lateral side adjacent to the first electrode layer 311.

In this case, a line width of the second electrode layer 321 may be less than that of the first electrode layer 311. Accordingly, the first electrode layer 311 can be prevented from being viewed due to the second electrode layer 321. The second electrode layer 321 may be provided only at a portion of the sixth sub-pattern 222. The second electrode layer 321 may be partially provided on the sixth sub-pattern 222. In other words, the second electrode layer 321 may be provided on only a portion of a pattern provided along the first sub-pattern 210.

Figure 9:
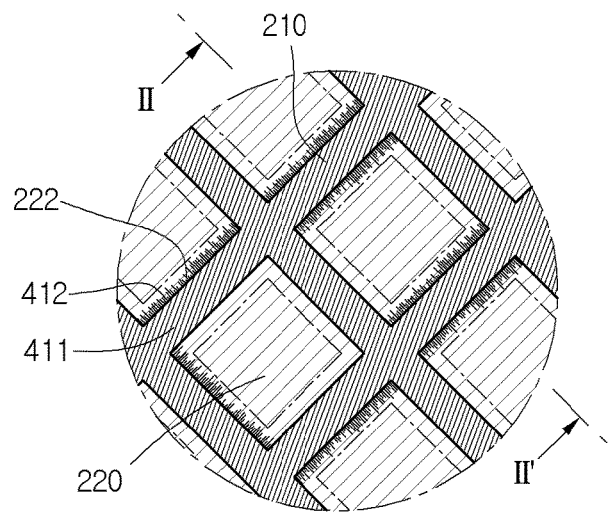
FIG. 9 is an enlarged view showing a touch window according to another embodiment.
Figure 10:
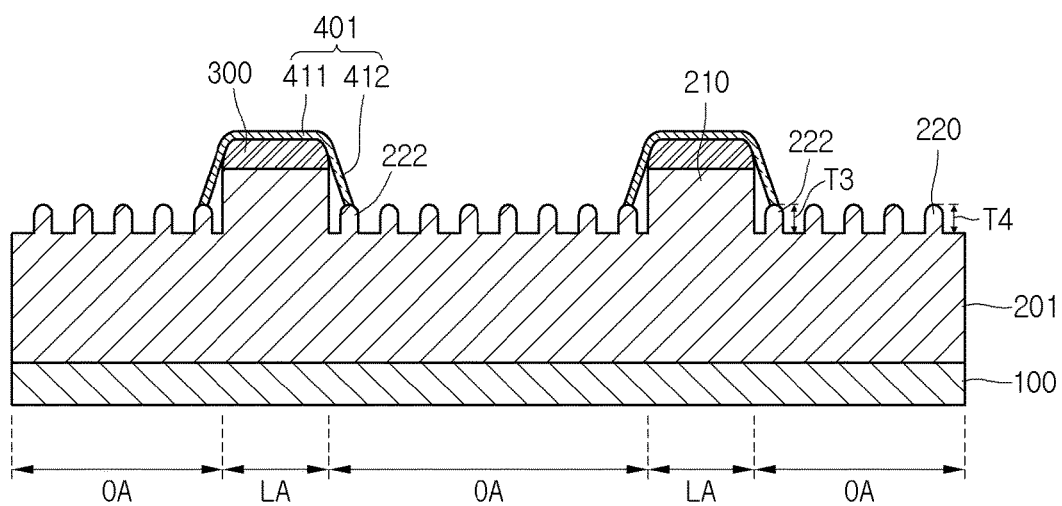
FIG. 10 is a sectional view taken along line II-II' of FIG. 9.

Meanwhile, hereinafter, a touch window according to another embodiment will be described with reference to FIGS. 9 and 10. Referring to FIGS. 9 and 10, the touch window according to another embodiment further includes an anti-reflective layer 401. In detail, a first sub-pattern 210 is provided thereon with an electrode layer 300, and the electrode layer 300 is provided thereon with the anti-reflective layer 401. The anti-reflective layer 401 includes first and second anti-reflective layers 411 and 412.

The first anti-reflective layer 411 is provided on the first sub-pattern 210. In other words, the first anti-reflective layer 411 is provided on the electrode layer 300.

The second anti-reflective layer 412 is provided on the second sub-pattern 220. In detail, the second sub-pattern 220 includes a sixth sub-pattern 222 provided along the first sub-pattern 210, and the second anti-reflective layer 412 is provided on the sixth sub-pattern 222.

Meanwhile, the second anti-reflective layer 412 may surround the first anti-reflective layer 411. The second anti-reflective layer 412 may be provided at an outer portion of the first anti-reflective layer 411. The second anti-reflective layer 412 may be provided at a lateral side of the first anti-reflective layer 411. The first anti-reflective layer 411 may be provided on a top surface of the electrode layer 300. The second anti-reflective layer 412 extends from the first anti-reflective layer 411 so that the second anti-reflective layer 412 is provided on a lateral side of the electrode layer 300.

The second anti-reflective layer 412 may be bent from the first anti-reflective layer 411 to the substrate 100. In other words, the second anti-reflective layer 412 may be curved or bent downward from the first anti-reflective layer 411. Therefore, an end portion of the anti-reflective layer 401 may be provided lower than the height of the top surface of the electrode layer 300. Accordingly, the second anti-reflective layer 412 may surround the lateral side of the electrode layer 300. Therefore, the second anti-reflective layer 412 can reduce the reflectance of the lateral side of the electrode layer 300, and can improve the visibility even in a wide viewing angle.

In this case, the sixth sub-pattern 222 has a thickness T3 that may be equal to or thicker than a thickness T4 of the second sub-pattern 220. In addition, the thickness T3 of the sixth sub-pattern 222 may be thinner than that of the first sub-pattern 210. Accordingly, the sixth sub-pattern 222 has a top end that may be higher than that of the second sub-pattern 220. Accordingly, the second sub-pattern 222 can stably support the second anti-reflective layer 412 bent and extending from the first anti-reflective layer 411 toward the substrate 110.

In addition, although the drawings show that the second anti-reflective layer 412 makes contact with the lateral side of the electrode layer 300, the embodiment is not limited thereto. Accordingly, the second anti-reflective layer 412 may be spaced apart from the lateral side of the electrode layer 300. In other words, the second anti-reflective layer 412 may be spaced apart from the lateral side of the electrode layer 300 by a predetermined distance without the contact with the lateral side of the electrode layer 300.

Further, although the drawings show that the second anti-reflective layer 412 makes contact with the sixth sub-pattern 222, the embodiment is not limited thereto. Accordingly, the second anti-reflective layer 412 may not directly make contact with the sixth sub-pattern 222.

Figure 11:
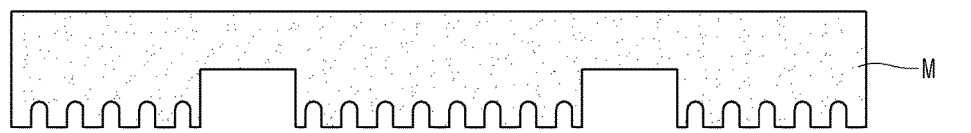
FIGS. 11 to 15 are sectional views to explain a method of fabricating the touch window according to the embodiments.
Figure 11:
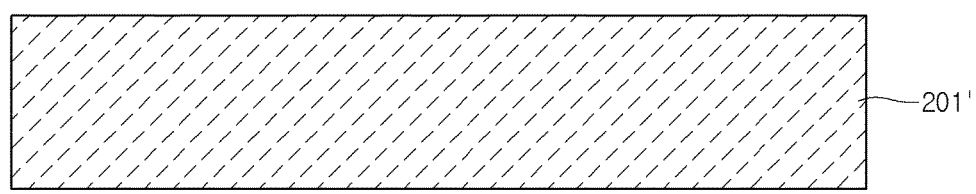
Figure 12:
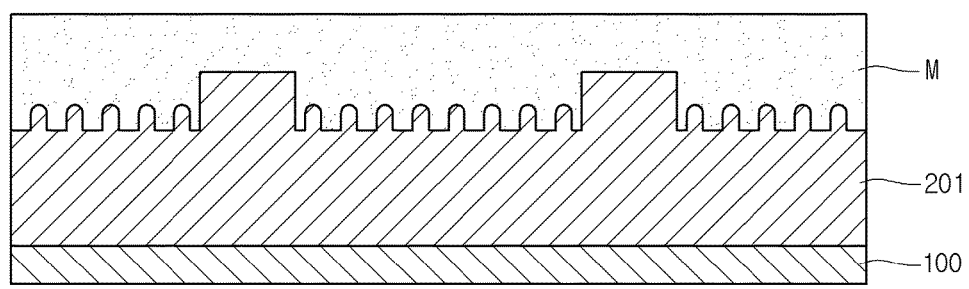

Hereinafter, a method of fabricating the touch window according to one embodiment will be described with reference to FIGS. 11 to 15. Referring to FIGS. 11 to 12, a mold M having a pattern may be placed on a resin 201' and an imprinting process may be performed.

Figure 13:
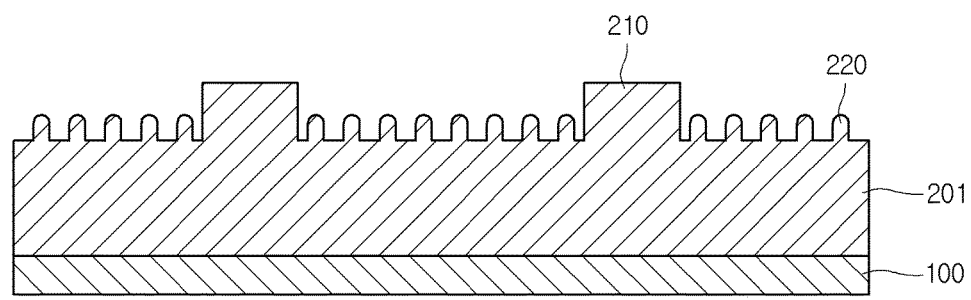
Figure 14:
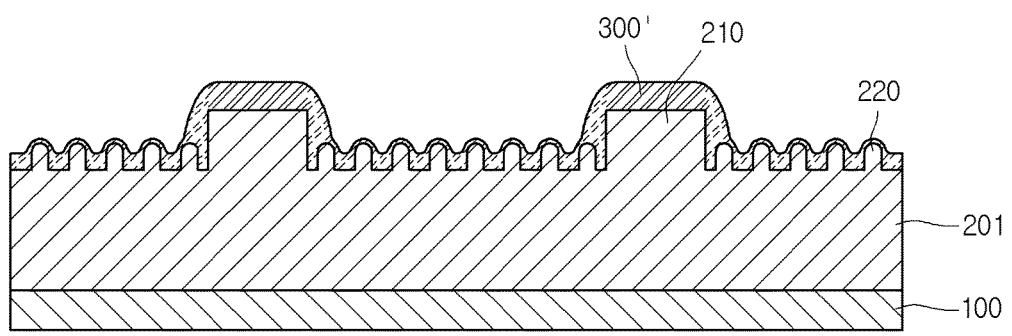

Referring to FIG. 13, the substrate 100 including the first and second sub-patterns 210 and 220 may be fabricated through the imprinting process. Referring to FIG. 14, an electrode material 300' may be formed on the first and second sub-patterns 210 and 220. The electrode material 300' may be formed through a deposition or plating scheme.

Figure 15:
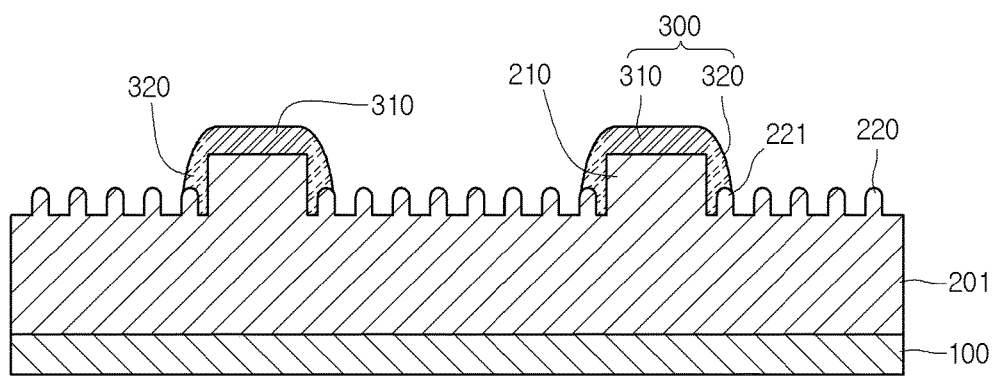

Referring to FIGS. 14 and 15, the electrode material 300' may be etched. In this case, an etched area may be varied depending on the difference between the structures of the first and second sub-patterns 210 and 220, and the difference between the contact areas of the first and second sub-patterns 210 and 220 and the electrode material 300'. In other words, since the contact area between the first sub-pattern 210 and the electrode material 300' is wider than the contact area between the second sub-pattern 220 and the electrode material 300', the electrode material 300' is less etched on the first sub-pattern 210. In other words, when the etching is performed at the same etching rate, the electrode material 300' on the first sub-pattern 210 remains, and the electrode material 300' on the second sub-pattern 220 is mostly etched. Meanwhile, the electrode material 300' remains at a portion of the second sub-pattern 220, so that the second electrode layer 320 may be formed. Meanwhile, although not shown in drawings, an anti-reflective material is further deposited on the electrode materials 300', so that the anti-reflective layer may be formed.

Figure 16:
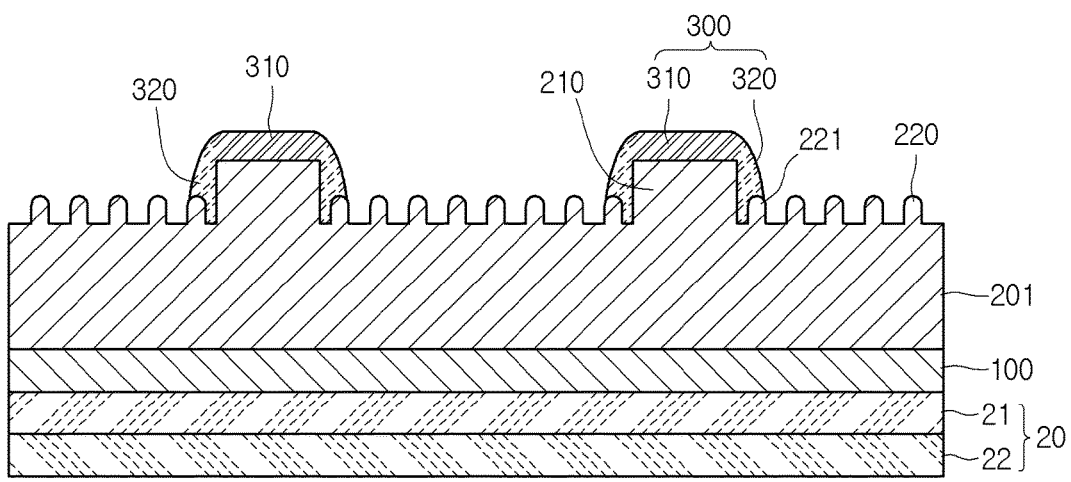
FIG. 16 to 17 are a sectional view showing a display in which the touch window according to the embodiment is provided on a display panel.
Figure 17:
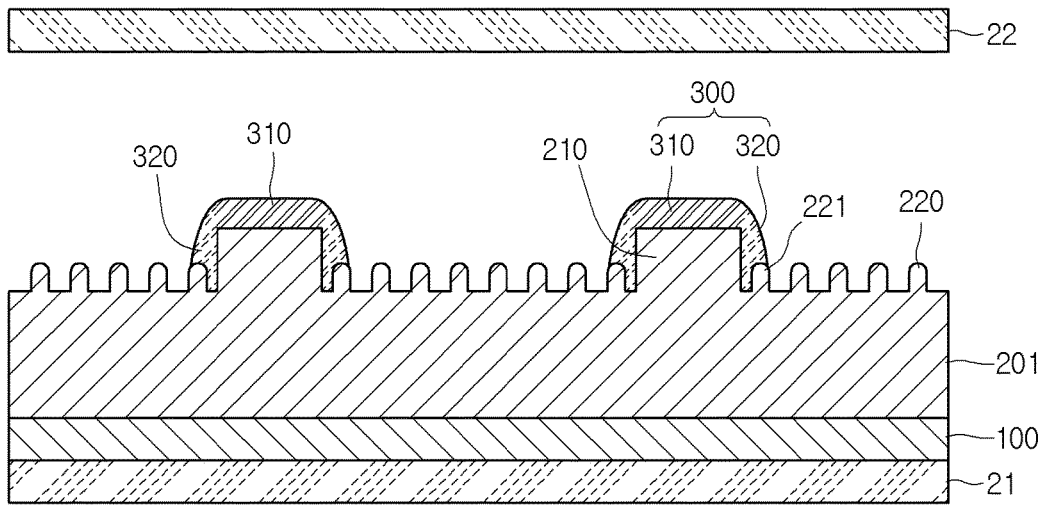

Hereinafter, a touch device formed by combining the touch window according to the embodiments described above with a display panel will be described with reference to FIGS. 16 and 17. As shown in FIGS. 16 and 17, the touch device according to the embodiment may include the touch window 10 formed integrally with a display panel 20. In this case, different from the structure shown in drawings, the substrate 100 having an electrode part may be omitted, but the embodiment is not limited thereto.

In detail, an electrode part 201 may be formed on at least one surface of the display panel 20. The display panel 20 includes a first panel substrate 21 and a second panel substrate 22. In other words, the electrode part 201 may be formed on at least one surface of the first panel substrate 21 or the second panel substrate 22.

When the display panel 20 is a liquid crystal display panel, the display panel 20 may be formed in a structure in which the first panel substrate 21 including a thin film transistor (TFT) and a pixel electrode is combined with the second panel substrate 22 including color filter layers while a liquid crystal layer is interposed between the first and second substrates 21 and 22.

In addition, the display panel 20 may be a liquid crystal display panel having a COT (color filter on transistor) structure in which a thin film transistor, a color filter, and a black matrix are formed on the first panel substrate 21, and the first panel substrate 21 is combined with the second panel substrate 22 while a liquid crystal layer is interposed between the first and second panel substrates 21 and 22. In other words, the thin film transistor may be formed on the first panel substrate 21, a protective layer may be formed on the thin film transistor, and the color filter layer may be formed on the protective layer. In addition, a pixel electrode making contact with the thin film transistor is formed on the first panel substrate 21. In this case, in order to improve the opening rate and simplify the mask process, the black matrix may be omitted, and the common electrode may perform the inherent function thereof and the function of the black matrix.

In addition, when the display panel 20 is a liquid crystal panel, the display device may further include a backlight unit for providing light from the rear surface of the display panel 20.

When the display panel 20 is an organic electroluminescent display panel, the display panel 20 includes a self light-emitting device which does not require any additional light source. The display panel 20 includes a thin film transistor formed on the first substrate 21 and an organic light emitting device (OLED) making contact with the thin film transistor. The OLED may include an anode, a cathode and an organic light emitting layer formed between the anode and the cathode. In addition, the second panel substrate 22 may be further formed on the organic light emitting device to perform the function of an encapsulation substrate for encapsulation.

In this case, at least one electrode part 201 may be formed on the top surface of an upper substrate. Although drawings show the structure in which the electrode part 201 is formed on the top surface of the second panel substrate 22, when the first panel substrate 21 may serve as the upper substrate, at least one electrode part 201 may be formed on the top surface of the first panel substrate 21.

Referring to FIG. 16, the electrode part 201 may be formed on the top surface of the display panel 20. In addition, a wire connected with the electrode part 201 may be formed. An adhesive layer 60 may be provided on the display panel 20 having the electrode part 201 and a cover substrate may be provided thereon.

Referring to FIG. 17, the display panel includes the first and second panel substrates 21 and 22, and the electrode part 201 is interposed between the first and second panel substrate 21 and 22. In other words, the electrode part 201 may be formed on at least one surface of the first panel substrate 21 or the second panel substrate 22.

Hereinafter, one example of the touch device employing the touch window according to the embodiments will be described with reference to FIGS. 18 to 21.

Figure 18:
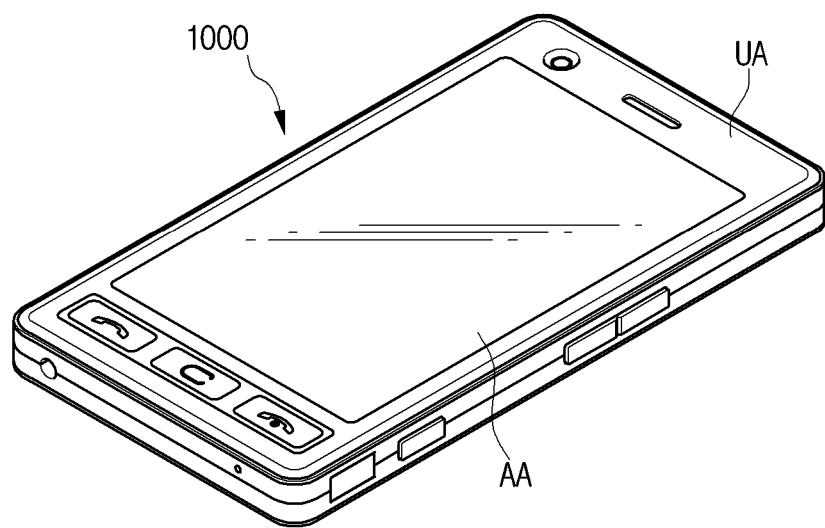
FIGS. 18 to 21 are views showing an example of a touch device employing the touch window according to the embodiments.

Referring to FIG. 18, as one example of the touch device, a mobile terminal is shown. The mobile terminal 1000 may include the active region AA and the unactive region UA. The active region AA may be provided to detect a touch signal generated from the touch by a finger, and the unactive region UA may be provided therein with a command icon pattern part and a logo.

Figure 19:
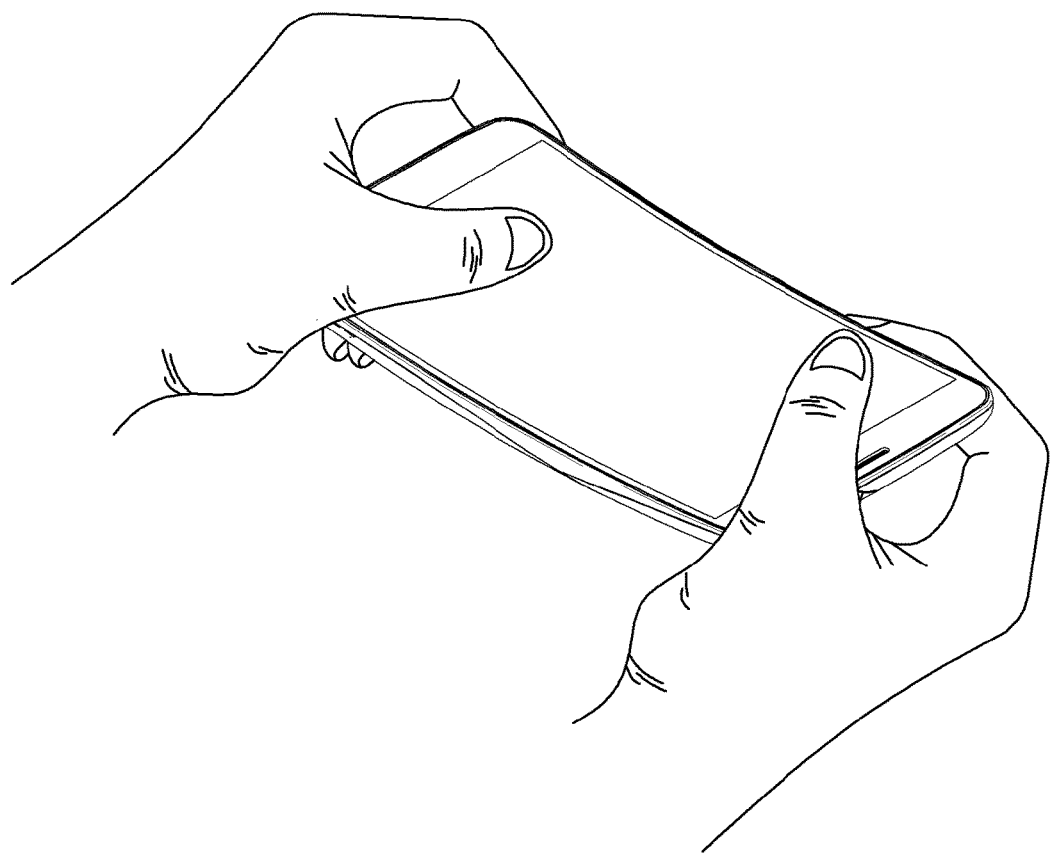

Referring to FIG. 19, the touch window may include a flexible touch window that may be bent. Accordingly, the touch device including the touch window may be a flexible touch device. Accordingly, a user can curve or bend the touch device with the hand of the user.

Figure 20:
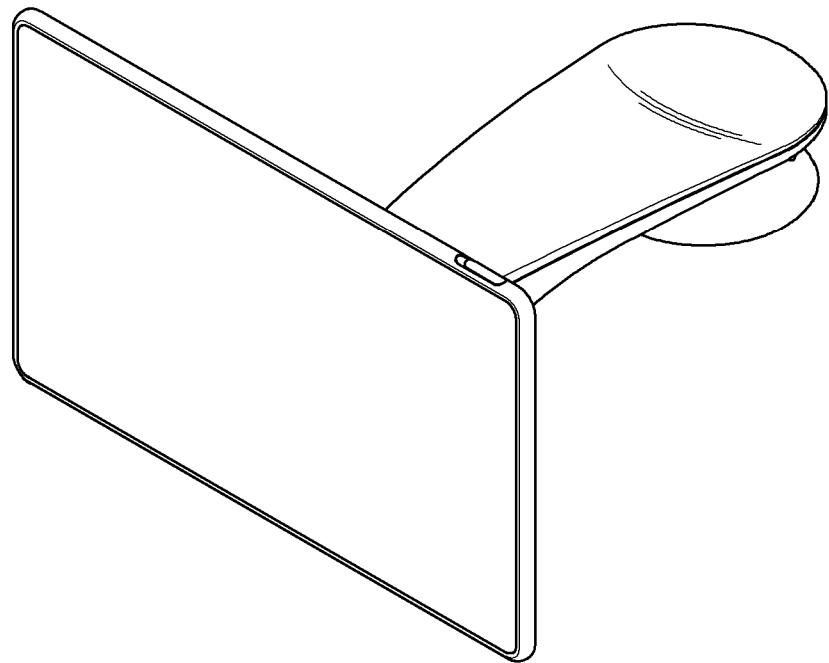
Figure 21:

Referring to FIG. 20, the touch window may be applied to vehicle navigation as well as a touch device such as the mobile terminal. Referring to FIG. 21, the touch window may be applied into a vehicle. In other words, the touch window may be applied to various parts in the vehicle, which allow the application of the touch window. Accordingly, the touch window is applied to a dashboard as well as a PND (Personal Navigation Display), thereby realizing a CID (Center Information Display). However, the embodiment is not limited to the embodiment. In other words, the display may be used in various electronic products.

The embodiment provides a touch window having improved reliability and a display including the same.

According to one embodiment, there is provided a touch window including a substrate, and an electrode part provided on the substrate to detect a position. The electrode part includes a first sub-pattern, a second sub-pattern provided adjacent to the first sub-pattern, a first electrode player on the first sub-pattern, and a second electrode layer on the second sub-pattern.

According to another embodiment, there is provided a touch window including a substrate, and an electrode part provided on the substrate to detect a position. The electrode part includes a first sub-pattern, a second sub-pattern provided adjacent to the first sub-pattern, an electrode layer on the first sub-pattern, a first anti-reflective layer on the first sub-pattern, and a second anti-reflective layer on the second sub-pattern.

As described above, the touch window according to one embodiment includes the first electrode layer and the second electrode layer adjacent to the first electrode layer. Accordingly, the disconnection or the short of the electrode layer may be prevented. In addition, even if a portion of the first electrode layer is delaminated or shorted, the second electrode layer may compensate for the short or the delamination of the portion of the first electrode layer, so that the electrical short can be compensated.

Meanwhile, the touch window according to another embodiment includes the anti-reflective layer. The anti-reflective layer can prevent the increase of the visibility caused by the light reflection of the electrode layer including the metallic material. In particular, as described above, since the anti-reflective layer may lower the reflectance from a lateral side of the electrode layer as well as the top surface of the electrode layer, so that the anti-reflective layer has an advantage in visibility. In addition, the visibility can be improved even in a wide viewing angle. Therefore, the optical characteristic of the electrode layer can be improved. In addition, the anti-reflective layer can protect the electrode layer from an external environment. Therefore, the reliability of the touch window can be improved.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
    a substrate;
    a resin layer on the substrate; and
    at least one electrode layer provided on the resin layer to detect a touch position,
    wherein the resin layer includes a first sub-pattern protruding from the resin layer and a second sub-pattern protruding from the resin layer and provided adjacent to the first sub-pattern and having a line width narrower than a line width of the first sub-pattern,
    wherein the first sub-pattern includes a third sub-pattern extending in a first direction and a fourth sub-pattern extending in a second direction crossing the first direction,
    wherein the second sub-pattern includes a fifth sub-pattern between the third sub-pattern and the fort sub pattern, wherein the fifth sub-pattern is arranged nearest to the intersection between the third and fourth sub-patterns, wherein, the at least one electrode layer includes a first electrode layer on the first sub-pattern and a second electrode layer on the fifth sub-pattern, wherein the first electrode layer is provided in a mesh shape, and wherein a height of the first sub-pattern protruding from the resin layer is higher than a height of the second sub-pattern protruding from the resin layer.

2. The touch window of claim 1, wherein the second electrode layer has a thickness thicker than a thickness of the first electrode layer.

3. The touch window of claim 1, wherein the second electrode layer has a width narrower than a width of the first electrode layer.

4. The touch window of claim 1, wherein the second electrode layer extends from the first electrode layer.

5. The touch window of claim 1, wherein the second electrode layer is formed integrally with the first electrode layer.

6. The touch window of claim 1, further comprising:
a first anti-reflective layer on the first electrode layer; and
a second anti-reflective layer on the second electrode layer.

7. The touch window of claim 6, wherein the second anti-reflective layer extends from the first anti-reflective layer.

8. The touch window of claim 6, wherein the second anti-reflective layer is formed integrally with the first anti-reflective layer.

9. The touch window of claim 1, further including a conductive pattern line part, wherein the conductive pattern line part has a line width of 0.1 μm to 10 μm.

10. The touch window of claim 1,
wherein the first sub-pattern and the second sub-pattern are an embossed pattern.

11. The touch window of claim 1,
wherein the second electrode layer includes a same material as that of the first electrode layer.

12. The touch window of claim 1,
wherein the first electrode layer and the second electrode layer include copper (Cu), gold (Au), silver (Ag), aluminum (Al), titanium (Ti), nickel (Ni) or an alloy thereof.

13. The touch window of claim 6,
wherein the first anti-reflective layer and the second anti-reflective layer cover an entire top surface of the first electrode layer and the second electrode layer.

* * * * *